United States Patent [19]
van Laar

[11] Patent Number: 5,921,375
[45] Date of Patent: Jul. 13, 1999

[54] TRANSFER DEVICE AND ASSEMBLY OF TRANSFER DEVICES

[75] Inventor: Gerardus Johannes Catharina van Laar, Scherpenzeel, Netherlands

[73] Assignee: EBM Techniek B.V., Scherpenzeel, Netherlands

[21] Appl. No.: 08/670,447

[22] Filed: Jun. 26, 1996

[30] Foreign Application Priority Data

Jun. 27, 1995 [NL] Netherlands ............................ 1000675

[51] Int. Cl.⁶ .................................................. B65G 47/34
[52] U.S. Cl. ................................... 198/471.1; 198/468.4; 198/370.12
[58] Field of Search ........................ 198/370.1, 370.12, 198/438, 408, 440, 441, 436, 468.4, 471.1, 803.5

[56] References Cited

U.S. PATENT DOCUMENTS

| | | | |
|---|---|---|---|
| 1,461,222 | 7/1923 | Myers | 198/471.1 |
| 1,878,156 | 9/1932 | Lorenz | 198/436 |
| 1,887,211 | 11/1932 | Mortimer . | |
| 2,359,433 | 10/1944 | McNamara | 198/471.1 |
| 2,606,658 | 8/1952 | Powell | 198/370.12 |
| 3,133,638 | 5/1964 | Calhoun | 198/370.12 |
| 4,249,439 | 2/1981 | Leclerc et al. | 198/803.5 |
| 4,815,913 | 3/1989 | Hata et al. | 198/471.1 |
| 5,381,884 | 1/1995 | Spatafora et al. | 198/803.5 |
| 5,469,953 | 11/1995 | Igarashi et al. | 198/471.1 |

FOREIGN PATENT DOCUMENTS

| | | | |
|---|---|---|---|
| 0538767 | 4/1993 | European Pat. Off. | B65G 47/84 |
| 2152773 | 4/1973 | France | B65G 47/00 |
| 2516901 | 5/1983 | France | B65G 47/90 |
| 678616 | 10/1991 | Switzerland | B65G 47/68 |

*Primary Examiner*—Joseph E. Valenza
*Attorney, Agent, or Firm*—Webb Ziesenheim Logsdon Orkin Hanson, P.C.

[57] ABSTRACT

The invention relates to a device for transferring products from a product supply belt to a product discharge belt, wherein the transporting direction of the product discharge belt lies at an angle relative to the transporting direction of the product supply belt, comprising:

- a product gripping member for gripping a product on the product supply belt and releasing a product above a product discharge belt,
- a manipulator for moving the gripping member between a gripping position and a releasing position, and
- drive means for driving the gripping member and the manipulator.

The invention also relates to an assembly of a plurality of such transfer devices.

18 Claims, 5 Drawing Sheets

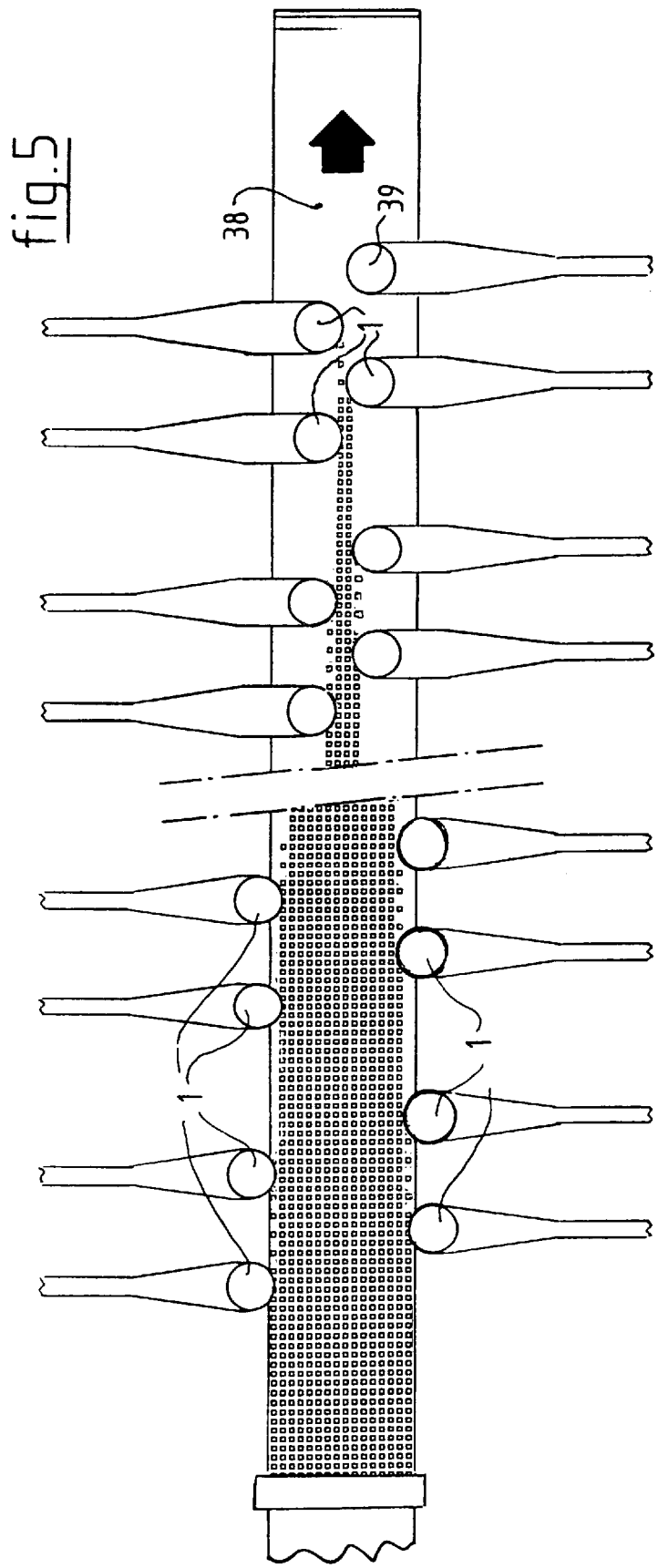

TRANSFER DEVICE AND ASSEMBLY OF TRANSFER DEVICES

BACKGROUND OF THE INVENTION

1. Field of the Invention

The invention relates to a device for transferring individual products from a supply position to a discharge position. The invention also relates to an assembly of such transfer devices.

2. Description of the Prior Art

The processing of large flows of products to smaller product flows occurs frequently in industrial enterprises. Envisaged here is for instance the manufacture of consumer products and particularly the separation of a main product flow into a number of parallel product flows. This offers advantages in different further processes and/or when the processing stations for the further processing have a limited capacity. An obvious example hereof is the packaging of foodstuffs such as biscuits or other foods. At the end of a wide conveyor belt it is usual to see in such cases many members of staff removing the products manually from the conveyor belt and subsequently placing them into the desired packaging. This process is expensive and not very easily controlled. Manual processing may also involve hygiene problems.

The invention has for its object to provide a device for simplifying the transfer of products. A more reliable and controllable process must be herein obtained with less manpower and cost, which process is also less sensitive from the hygiene viewpoint.

SUMMARY OF THE INVENTION

The invention provides for this purpose a device for transferring products from a product supply belt to a product discharge belt wherein the transporting direction of the product discharge belt lies at an angle relative to the transporting direction of the product supply belt, comprising:

a product gripping member for gripping a product on the product supply belt and releasing a product above a product discharge belt, a manipulator for moving the gripping member between a gripping position and a releasing position, and drive means for driving the gripping member and the manipulator.

The invention also provides for this purpose an assembly of a plurality of transfer devices arranged on the same product supply belt wherein the control units of the individual manipulators are connected by the central control unit. The use of a product discharge belt in combination with the gripping member and manipulator has the important advantage that the part-flow thus created can be removed at a chosen position. It is herein also possible to separate from a supplied product flow products which are difficult to reach. A very wide conveyor belt can for instance be envisaged here on which the products far removed from the sides are difficult or impossible to grip manually. Another important advantage is that products can be separated as required into a part-flow or they can continue undisturbed on the path of the main flow. It will moreover be apparent that such a transfer device can be fitted into the existing infra-structure without adaptations. The transfer device according to the invention does not in any case impose any limitations in respect of the product supply belt.

The manipulator is preferably adapted to cause the gripping member to move in a practically perpendicular direction relative to the product supply belt. It is hereby possible to lift a product from the belt directly after it has been gripped whereby damage to the product can be prevented and whereby other products lying on the product supply belt cannot affect the removal of the gripped product.

The manipulator is also preferably displaceable along a guide relative to the product supply belt, which guide lies at an angle relative to the transporting direction of the product supply belt. Due to this sideways mobility of the manipulator relative to the product supply belt it is possible to adjust this sideways position subject to the orientation and the shape of the products lying on the product supply belt. Products are generally supplied lying one behind another in long rows. It also often occurs herein that the lateral position of the products is not determined exactly. A process taking place earlier may for instance be the reason for this, wherein for instance a tunnel-shaped oven or a transition between two successive endless conveyer belts can be envisaged. A relatively long product supply belt may also disturb the exact lateral orientation of the product. It is possible by means of the second guide, along which the manipulator is displaceable, to adapt the position of the manipulator to the position of the supplied products. It is also possible that different products are manufactured successively in one process line. The position of the manipulator is adjustable in such cases subject to the type of product supplied.

In a preferred embodiment the manipulator comprises a rotatable turntable provided with at least one gripping member, which turntable is preferably rotatable in two directions. A turntable has the advantage that the movement of the product gripping member between the gripping and releasing position is relatively simple to realize mechanically. The mobility in two directions has the advantage that lines for driving and controlling the product gripping member arranged around the turntable can take a comparatively simple form. Instead of expensive couplings to be incorporated in the rotation shaft, flexible conduits of sufficient length will suffice.

In yet another preferred embodiment the product discharge belt is preferably arranged partially above the product supply belt and the manipulator comprises means for causing the gripping member to move in a direction substantially perpendicular to the product supply belt such that the distance between the product supply belt and the product discharge belt can be bridged. The advantages of discharging products sideways from a random position on the product supply belt have already been described above. By partly overlapping both belts the distance for bridging by the transfer device can be kept limited. This has the important advantage that the manipulator can take a small and therefore compact form.

The manipulator preferably comprises a stationary cam track with which the gripping member can be operated in a direction substantially perpendicular to the product supply direction. Using this cam track it becomes possible to control the distance for bridging by the gripping member. It is however advisable herein to separately control the gripping movement, however this may be realized. If the distance in transporting direction between the products on the product supply belt varies, it is then possible to vary the moment of gripping. A movable segment for controlling the gripping member included in the cam track in a preferred embodiment obviates this problem in effective manner when the movement hereof can be controlled separately.

Yet another preferred embodiment comprises a control unit for controlling the manipulator and the gripping member and at least one sensor for determining the position of products supplied on the product supply belt. The position of the supplied products can be determined by means of the sensors, whereafter the control unit can subsequently control the manipulator on the gripping member such that this detected position is taken into account.

The invention also provides an assembly of a plurality of transfer devices which are controlled by the collective control unit. It hereby becomes possible in the case of malfunction, maintenance operations etc. in one or more of the transfer devices to change the control of the other transfer devices such that the non-transferred products are still taken off the product supply belt. Sufficient overcapacity must then be available, however. Such an assembly can also make use of collective sensors.

BRIEF DESCRIPTION OF THE DRAWINGS

The present invention will be further elucidated with reference to the non-limitative embodiments shown in the following figures. Herein:

FIG. 5 is a schematic top view of an assembly of a plurality of transfer devices according to the invention.

DESCRIPTION OF THE PREFERRED EMBODIMENTS

Figure 1:
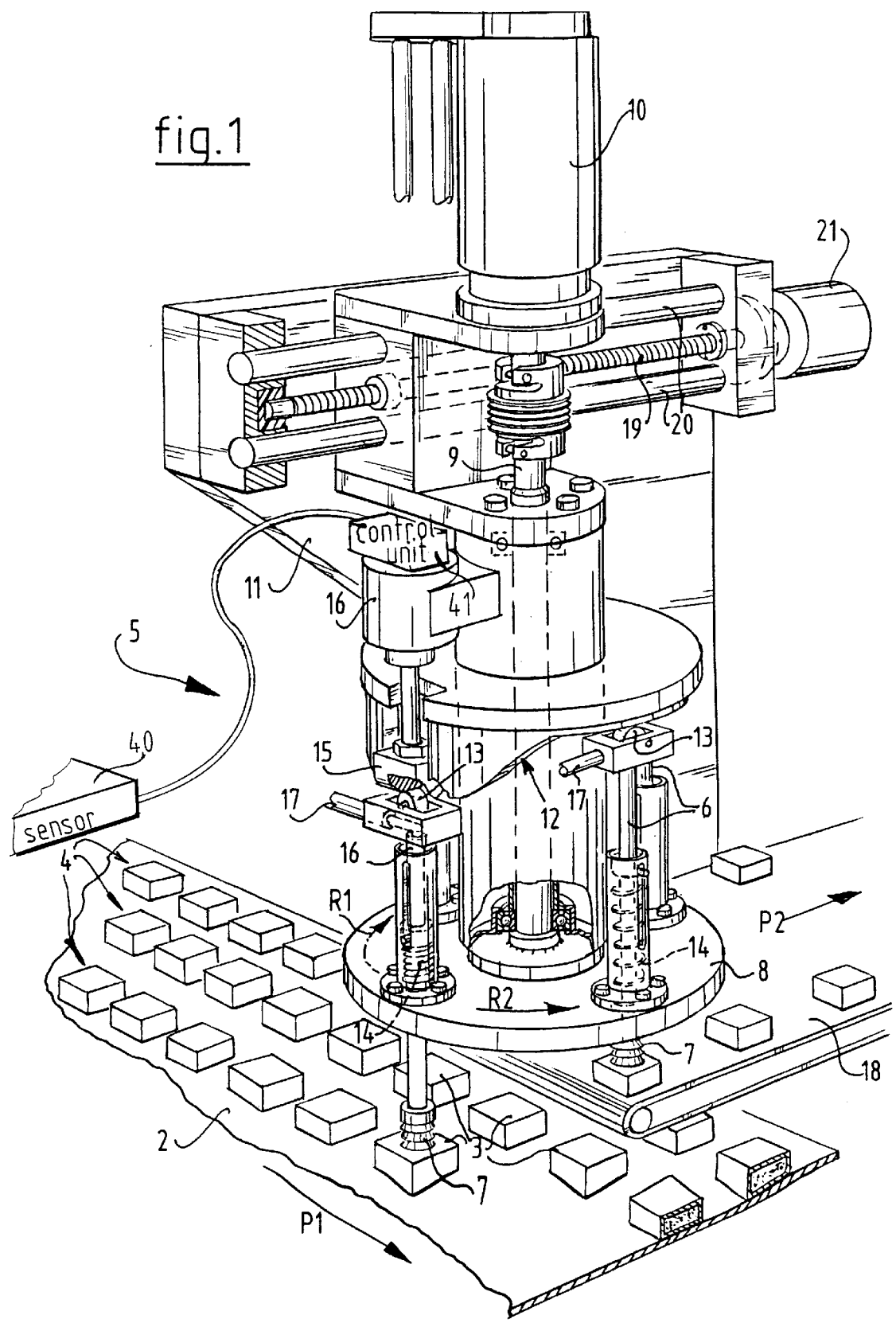
FIG. 1 shows a partly cut away perspective view of a transfer device according to the invention.

The transfer device 1 shown in FIG. 1 is arranged for removing products 3 from a supply belt 2. Products 3 are placed in rows 4 on supply belt 2. Supply belt 2 moves in the direction P1. Placed above supply belt 2 is a manipulator 5 to cause movement of four holders 6 which are mounted thereto and which have suction cups 7 fixed thereon. These holders 6 with suction cups 7 are mounted on a turntable 8 rotatable in two directions R1, R2. Turntable 8 is driven by a drive 10 with interposing of a shaft 9. The drive 10 is connected to a stationary frame 11. To the stationary frame 11 is also fixed a cam track 12 for co-acting with cam rollers 13 which are accommodated for rotation in the upper part of holders 6. With a rotating movement of turntable 8, and thus also of the holders 6 fixed thereto, the cam rollers 13 will move along the cam track 12. The cam rollers 13 are held in continuous contact with cam track 12 by a bias created by pressure springs 14. A part of cam track 12 is formed by a vertically displaceable segment 15. Using a separate drive 16 the segment 15 can be controlled independently of other movements. The independently moveable segment 15 hereby provides some freedom in time for determining the moment of gripping of a product 3. The vertical movement of holders 6 is thus substantially controlled by the cam track 12. Only the actual moment of gripping of a product is realized by moving segment 15. Gripping of product 3 takes place by underpressure in the suction cup 7. Each holder 6 is provided for this purpose with a continuous opening (not shown) which communicates on the underside with suction cup 7 and which is connected at the top to a conduit 17 which is connected to an exhaust system. Instead of with underpressure gripping can of course also take place using for instance a gripper or pricking device.

After a product 3 has been gripped by a suction cup 7 the segment 15 will be moved upward again and the turntable can be moved further. The product 3 is thereby lifted from supply belt 2. This vertical movement relative to supply belt 2 provides the possibility of transferring the product onto a discharge belt 18 at a higher position than supply belt 2. The transporting direction of discharge belt 18 is shown with arrow P2. Because it is possible to bridge a difference in height between belts 2, 18, the discharge belt 18 can be placed above the supply belt 2. This is especially advantageous as indicated above. Because the turntable 8 is rotatable in two directions R1, R2, no expensive provisions are required to create underpressure in the suction cups 7. If the turntable is always moved successively in opposing directions, flexible underpressure conduits 17 can suffice instead of fully rotatable conduit couplings which are very expensive and prone to require maintenance. The possible methods will be further described with reference to FIG. 2 as described hereinbelow. The manipulator 5 is also displaceable in sideways direction relative to supply belt 2 in that it is connected to the stationary frame 11 with interposing of a screw spindle 19 and a guide 20. The sideways position of the manipulator can be controlled using a drive 21.

The three degrees of freedom of this manipulator 5, which are controlled by the drives 10, 16 and 21, will be controlled by a control unit (not shown). The exhaust device connected to the underpressure conduits 17 is also not shown here. Using sensors, represented by block 40 in FIG. 1, connected to a control unit, represented by block 41 in FIG. 1, it is possible to control the transfer device 1 such that products 3 can be transferred even when they are not situated in fixed positions.

Figure 2:
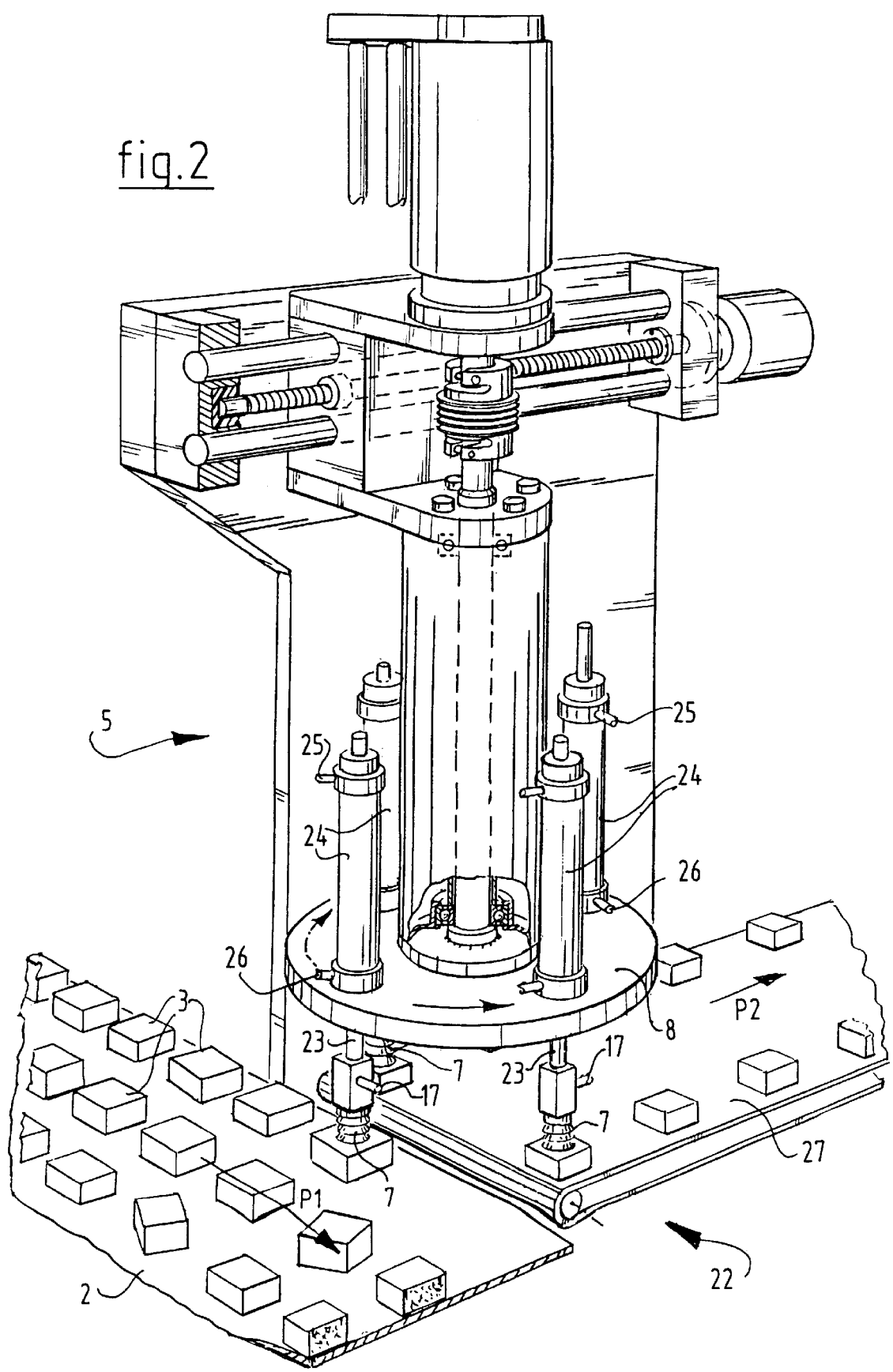
FIG. 2 shows a partly cut away perspective view of an alternative embodiment of the transfer device shown in FIG. 1.

The transfer device 22 shown in FIG. 2 differs from transfer device 1 shown in FIG. 1 in that the vertical movement of holders 23 to which suction cups 7 are fixed is realized by pistons 24. The latter are connected for this purpose via discharge conduits 25,26 to a hydraulic or pneumatic source (not shown).

In addition, the discharge belt 27 is arranged at virtually the same height as supply belt 2. It is however also possible to use a transfer device 22 with a supply belt 2 and a discharge belt 27 not situated at the same height.

The two directions of rotation R1,R2 of turntable 8 can also be employed as follows. A first product is gripped. The turntable 8 is subsequently moved 180 degrees in direction R1. The first gripped product is not set down while a second product is gripped by the opposite suction cup. The turntable 8 is then turned 90 degrees in the direction R2, in which position the two gripped products are set down and a new product gripped by the third suction cup. The turntable is subsequently displaced through 180 degrees in the direction R2 whereby the fourth suction cup 7 can grip a product. Finally, the turntable is rotated 90 degrees in the direction R1 and two gripped products 3 can be released. The turntable 8 is now situated once again in the starting position.

Other methods are of course also conceivable with this device, wherein the placing of products 3 on discharge belt 27 can differ from the positioning shown in this figure.

Figure 3:
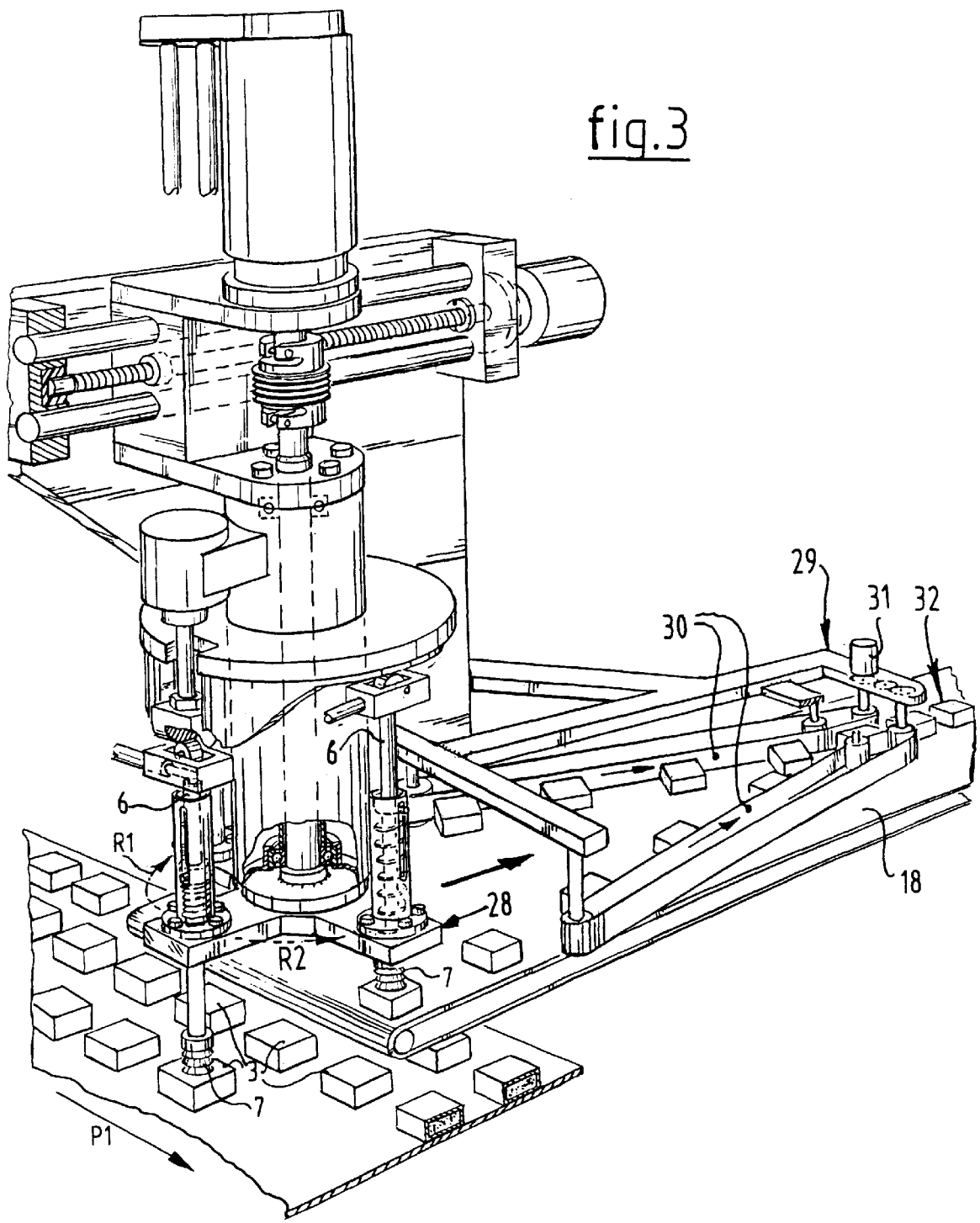
FIG. 3 shows a partly cut away perspective view of a third variant of the transfer device according to the invention.

FIG. 3 shows a variant of the transfer devices of FIGS. 1 and 2 wherein only two holders 6 are arranged on an angle-shaped turntable 28. The control of holders 6 corresponds with the situation shown in FIG. 1. Above discharge belt 18 is also arranged a guide 29 consisting of two synchronized endless conveyors driven by a drive 31. Products placed at different lateral positions on discharge belt 18 can hereby be placed in a single row 32.

Figure 4:
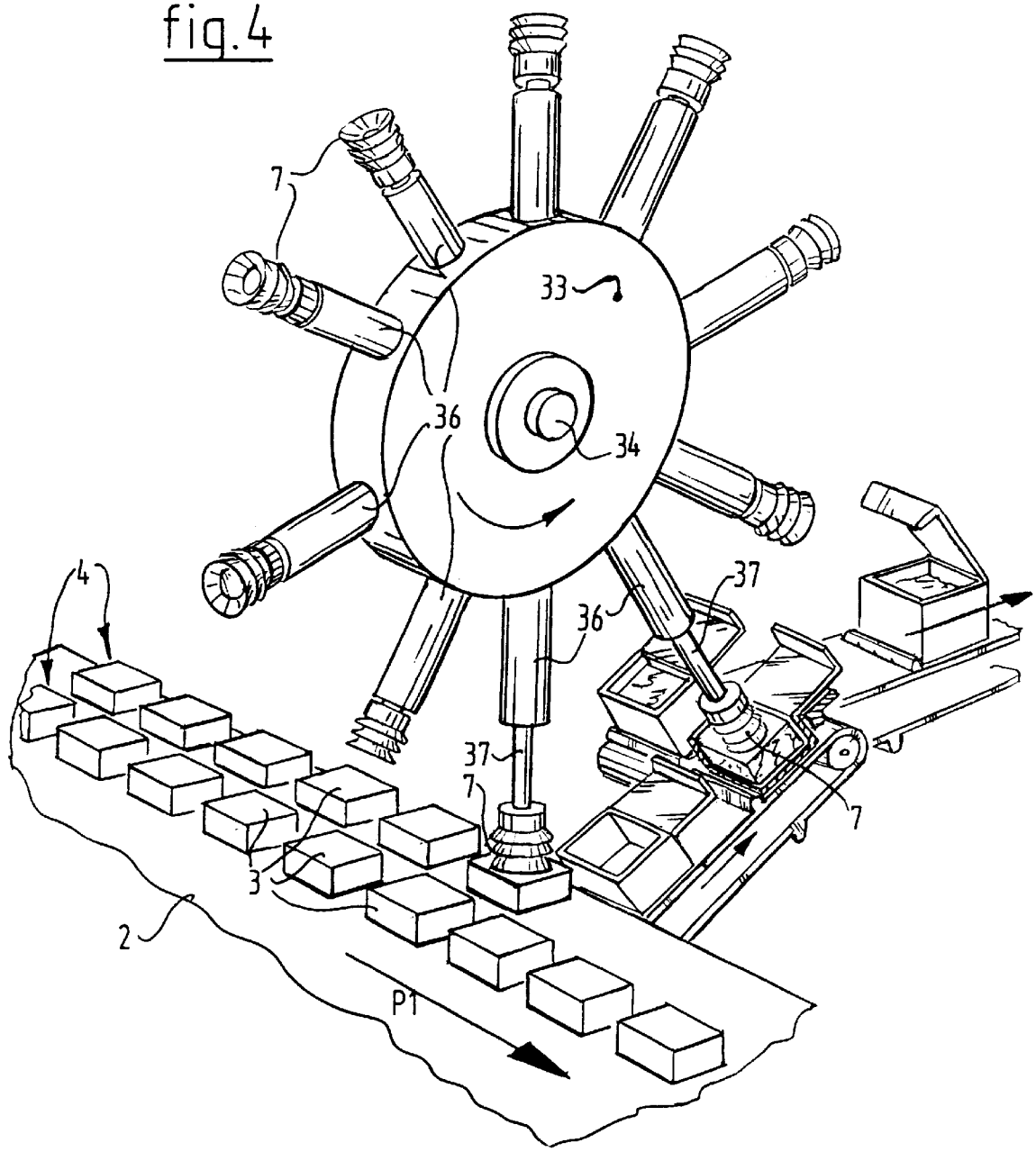
FIG. 4 shows a fourth alternative embodiment of the device according to the invention.

FIG. 4 shows yet another embodiment of a transfer device wherein a turntable 33 is rotatable around a shaft 34 which runs practically parallel to the direction P1 of supply belt 2. Mounted on turntable 33 are cylinders 36, on the cylinder rods 37 of which suction cups 7 are fixed. In order to provide sufficient freedom of movement it is herein also conceivable for shaft 34 to be displaceable in sideways direction relative to supply belt 2. This is not shown in this figure.

Finally, FIG. 5 shows a top view of a wide supply belt 38 on which products are supplied. A large number of transfer devices are placed adjacently of and above the belt to provide sufficient capacity. In the case of failure of one of the transfer devices, an extra transfer device 39 is arranged. As soon as one of the transfer devices 1 arranged in front of this becomes inoperative the extra transfer device 39 can be moved in sideways direction to that position where the row, or part of a row, which has not been picked up is situated. These remaining products can then be taken off using the extra transfer device 39. It is very advantageous to control the assembly of transfer devices shown here using a collective control unit (not shown).

I claim:

1. A device for transferring products from a product supply belt to a product discharge belt, wherein a transporting direction of the product discharge belt lies at an angle relative to a transporting direction of the product supply belt, the device comprising:
    a product gripping member for gripping a product on the product supply belt and releasing the product above the product discharge belt;
    a manipulator for moving the gripping member between a gripping position and a releasing position, the manipulator having a cam track which controls the gripping member in a direction substantially perpendicular to the product supply direction, and the cam track having at least one movable segment for controlling the gripping member; and
    a drive means for driving the gripping member and the manipulator.

2. A transfer device as claimed in claim 1, wherein the manipulator is displaceable along a guide relative to the product supply belt, which guide lies at an angle relative to the transporting direction of the product supply belt.

3. A transfer device as claimed in claim 1, wherein the manipulator comprises a rotatable turntable provided with at least one gripping member.

4. A transfer device as claimed in claim 3, wherein the turntable is rotatable in at least two directions.

5. A transfer device as claimed in claim 1, wherein the product discharge belt is arranged above the product supply belt and the manipulator comprises means for causing the gripping member to move in a direction substantially perpendicular to the product supply belt such that the distance between the product supply belt and the product discharge belt is bridged.

6. A transfer device as claimed in claim 1, further comprising a control unit for controlling the manipulator and the gripping member and at least one sensor for determining the position of products supplied on the product supply belt.

7. An assembly of a plurality of transfer devices as claimed in claim 6 arranged on the same product supply belt, wherein the control units of the separate manipulators are connected by a central control unit.

8. A transfer device as claimed in claim 2, wherein the manipulator comprises a rotatable turntable provided with at least one gripping member.

9. A transfer device as claimed in claim 2, wherein the product discharge belt is arranged above the product supply belt and the manipulator comprises means for causing the gripping member to move in a direction substantially perpendicular to the product supply belt such that the distance between the product supply belt and the product discharge belt is bridged.

10. A transfer device as claimed in claim 3, wherein the product discharge belt is arranged above the product supply belt and the manipulator comprises means for causing the gripping member to move in a direction substantially perpendicular to the product supply belt such that the distance between the product supply belt and the product discharge belt is bridged.

11. A transfer device as claimed in claim 4, wherein the product discharge belt is arranged above the product supply belt and the manipulator comprises means for causing the gripping member to move in a direction substantially perpendicular to the product supply belt such that the distance between the product supply belt and the product discharge belt is bridged.

12. A transfer device for transferring products from a product supply belt to a product discharge belt, wherein a transporting direction of the product discharge belt lies at an angle relative to a transporting direction of the product supply belt, the device comprising:
    a product gripping member for gripping a product on the product supply belt and releasing the product above the product discharge belt;
    a manipulator for moving the gripping member between a gripping position and a releasing position, the manipulator having a rotatable turntable provided with the gripping member, and the manipulator further having a cam track which controls the gripping member in a direction substantially perpendicular to the product supply direction; and
    a drive means for driving the gripping member and the manipulator,
    wherein the turntable is rotatable in at least two directions.

13. A device for transferring products from a product supply belt to a product discharge belt, wherein a transporting direction of the product discharge belt lies at an angle relative to a transporting direction of the product supply belt, the device comprising:
    a product gripping member for gripping a product on the product supply belt and releasing the product above the product discharge belt;
    a manipulator for moving the gripping member between a gripping position and a releasing position, the manipulator having a holder, the holder having a first end and a second end, the holder further having a cam roller at the first end and the gripping member at the second end, the manipulator further having a cam track co-acting with the cam roller and controlling the movement of the holder and the gripping member in a vertical direction substantially perpendicular to the product supply direction; and
    a drive means for driving the gripping member and the manipulator,
    wherein the manipulator includes a turntable rotatable in at least two directions.

14. A transfer device as claimed in claim 13, wherein the manipulator is displaceable along a guide relative to the product supply belt, which guide lies at an angle relative to the transporting direction of the product supply belt.

15. A transfer device as claimed in claim 13, wherein the product discharge belt is arranged above the product supply belt and the manipulator includes means for causing the gripping member to move in a direction substantially perpendicular to the product supply belt such that the distance between the product supply belt and the product discharge belt is bridged.

16. A transfer device as claimed in claim 12, wherein the manipulator is displaceable along a guide relative to the product supply belt, which guide lies at an angle relative to the transporting direction of the product supply belt.

17. A transfer device as claimed in claim 12, wherein the product discharge belt is arranged above the product supply belt and the manipulator includes means for causing the gripping member to move in a direction substantially perpendicular to the product supply belt such that the distance between the product supply belt and the product discharge belt is bridged.

18. A device for transferring products from a product supply belt to a product discharge belt, wherein a transporting direction of the product discharge belt lies at an angle relative to a transporting direction of the product supply belt, the device comprising:

a product gripping member for gripping a product on the product supply belt and releasing the product above the product discharge belt;

a manipulator for moving the gripping member between a gripping position and a releasing position, the manipulator having a holder, the holder having a first end and a second end, the holder further having a cam roller at the first end and the gripping member at the second end, the manipulator further having a cam track co-acting with the cam roller and controlling the movement of the holder and the gripping member in a vertical direction substantially perpendicular to the product supply direction; and a drive means for driving the gripping member and the manipulator, wherein the cam track includes at least one movable segment for controlling the gripping member.

* * * * *